Figure 3:
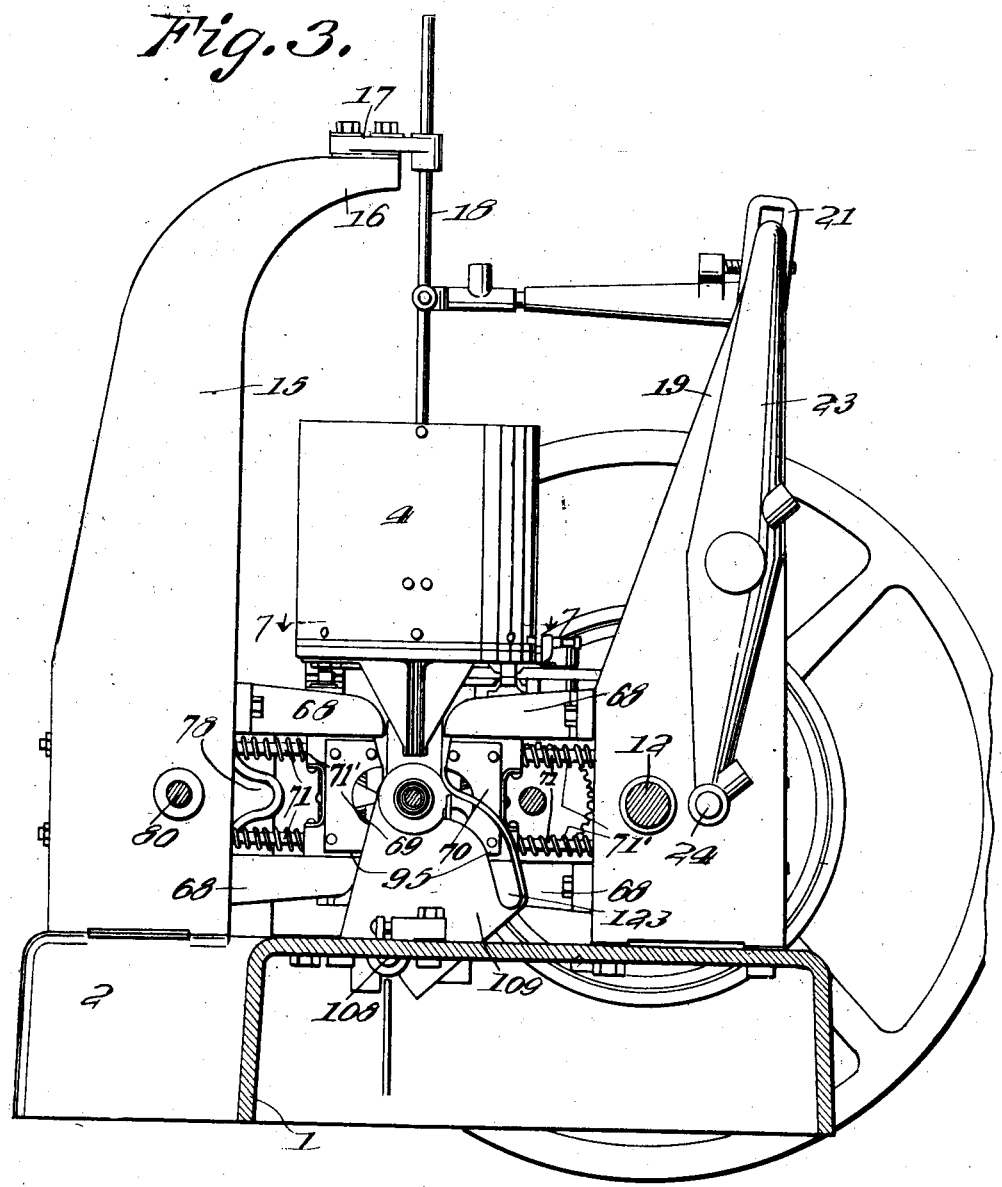

W. A. J. ROACH.
MACHINE FOR SHELLING NUTS.
APPLICATION FILED SEPT. 20, 1909.
990,294.
Patented Apr. 25, 1911.
9 SHEETS—SHEET 1.
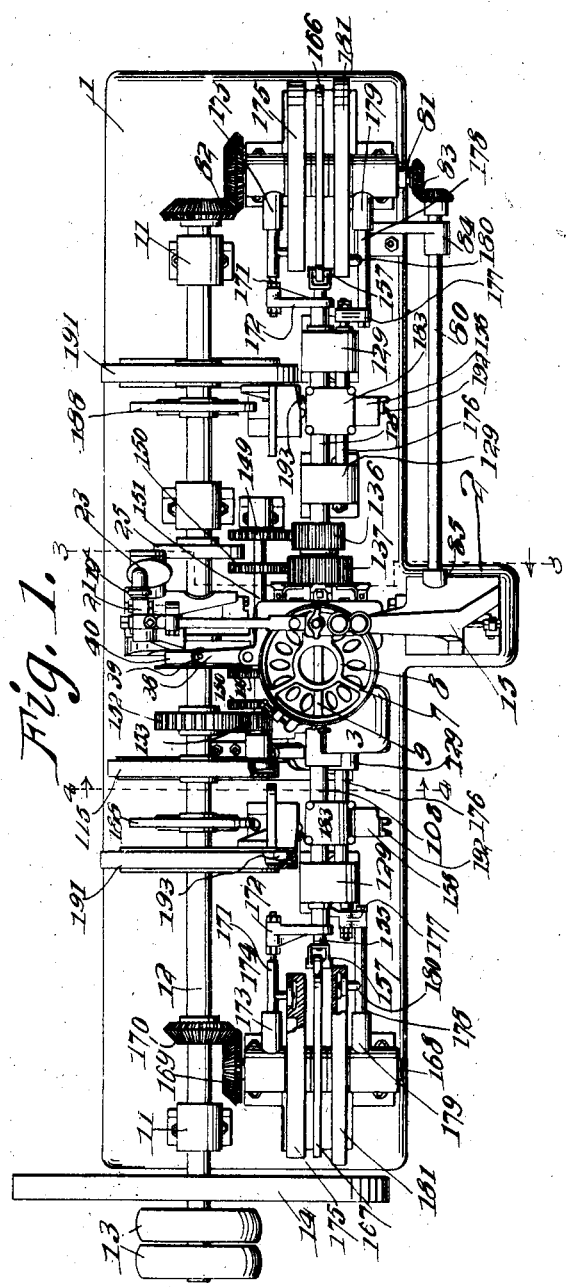
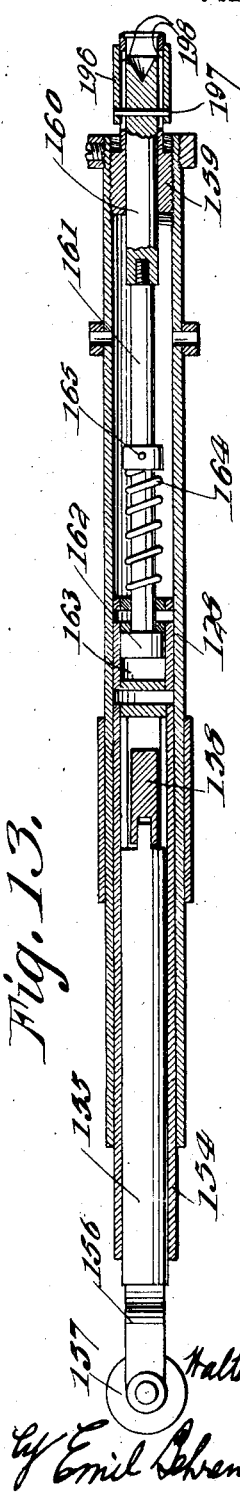

W. A. J. ROACH.
MACHINE FOR SHELLING NUTS.
APPLICATION FILED SEPT. 20, 1909.
990,294.
Patented Apr. 25, 1911.
9 SHEETS—SHEET 2.
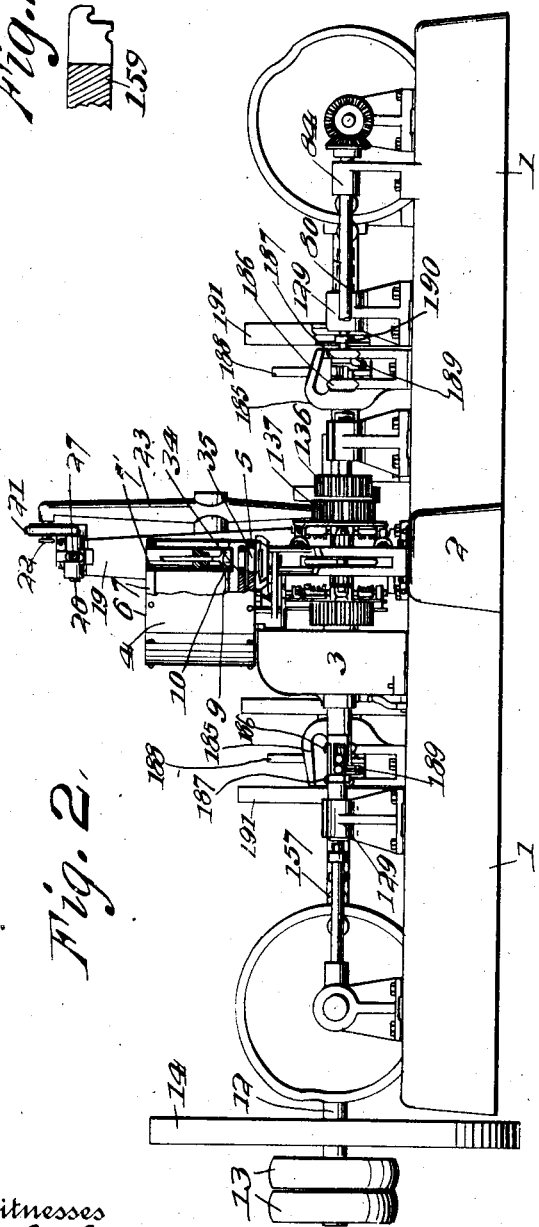

W. A. J. ROACH.
MACHINE FOR SHELLING NUTS.
APPLICATION FILED SEPT. 20, 1909.

990,294.

Patented Apr. 25, 1911.
9 SHEETS—SHEET 5.

Witnesses
M. E. Connor
Edward R. Whitman

Inventor
Walter A. J. Roach
by
Emil Behrens Attorney

W. A. J. ROACH.
MACHINE FOR SHELLING NUTS.
APPLICATION FILED SEPT. 20, 1909.
990,294.
Patented Apr. 25, 1911.
9 SHEETS—SHEET 6.
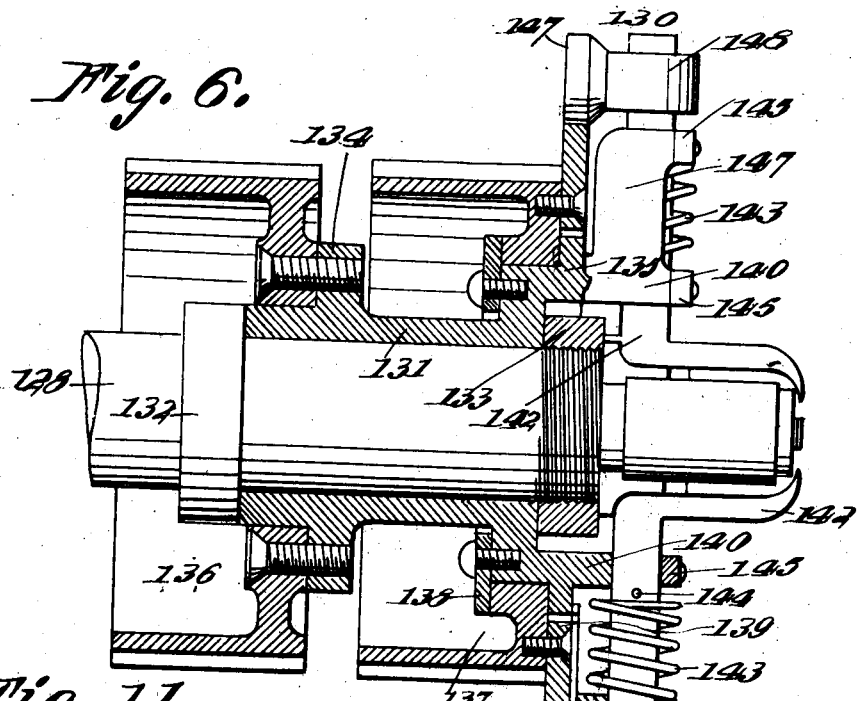
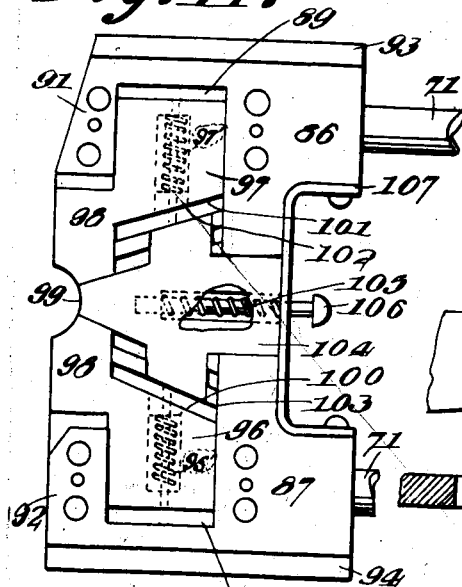
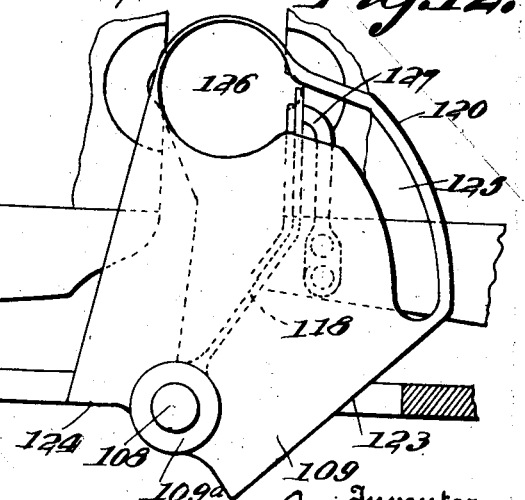

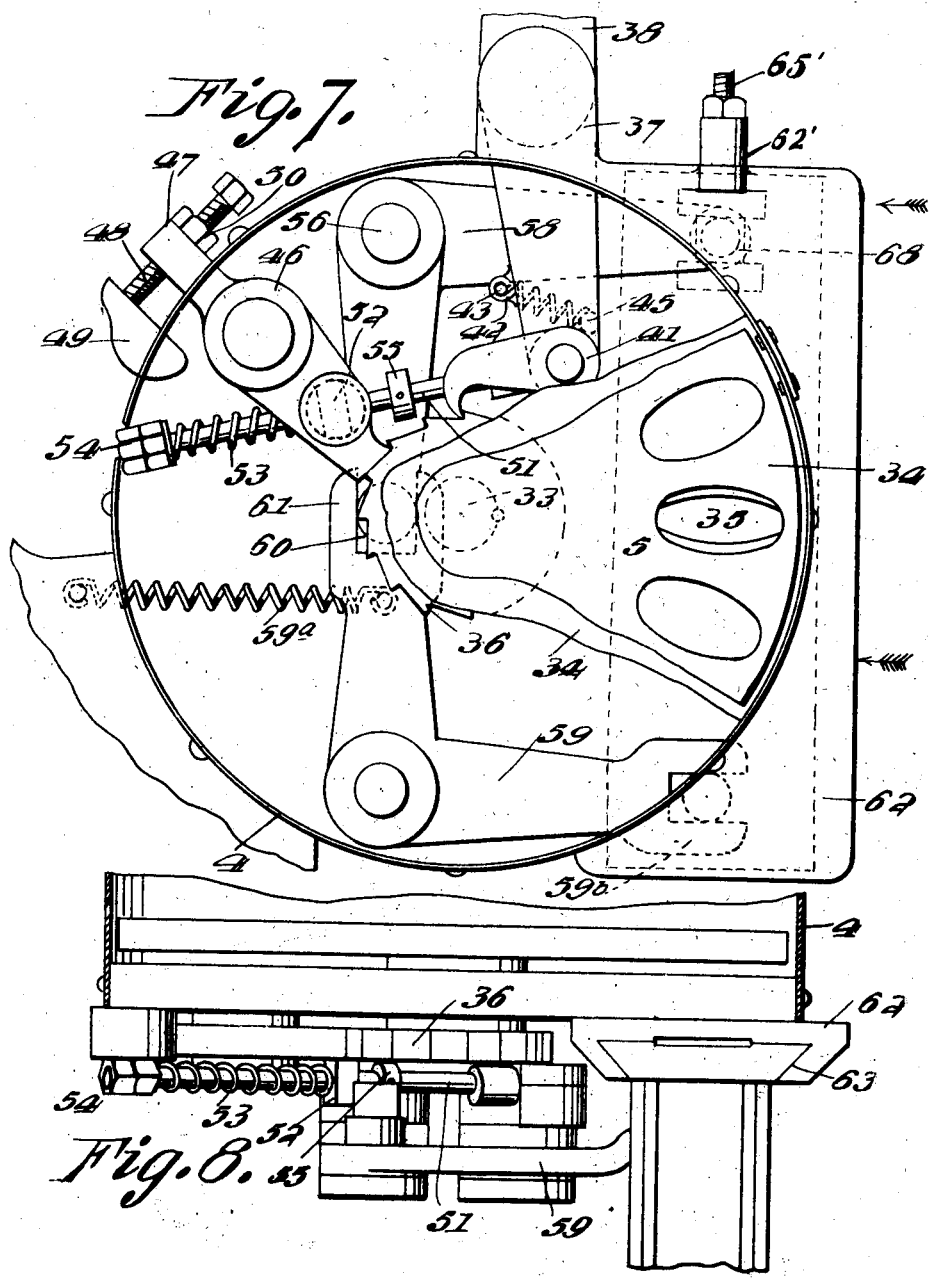

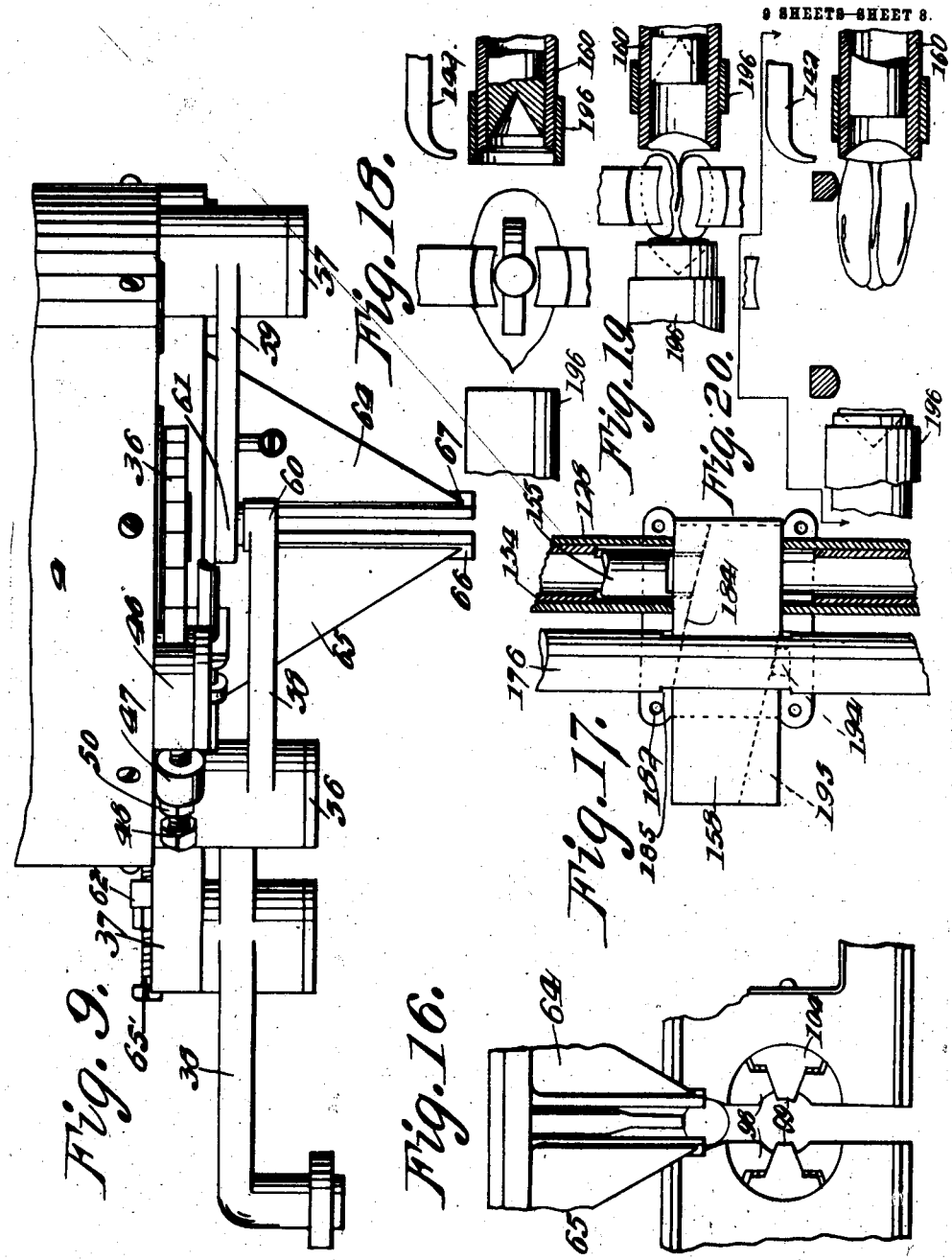

W. A. J. ROACH.
MACHINE FOR SHELLING NUTS.
APPLICATION FILED SEPT. 20, 1909.
990,294.
Patented Apr. 25, 1911.
9 SHEETS—SHEET 9.
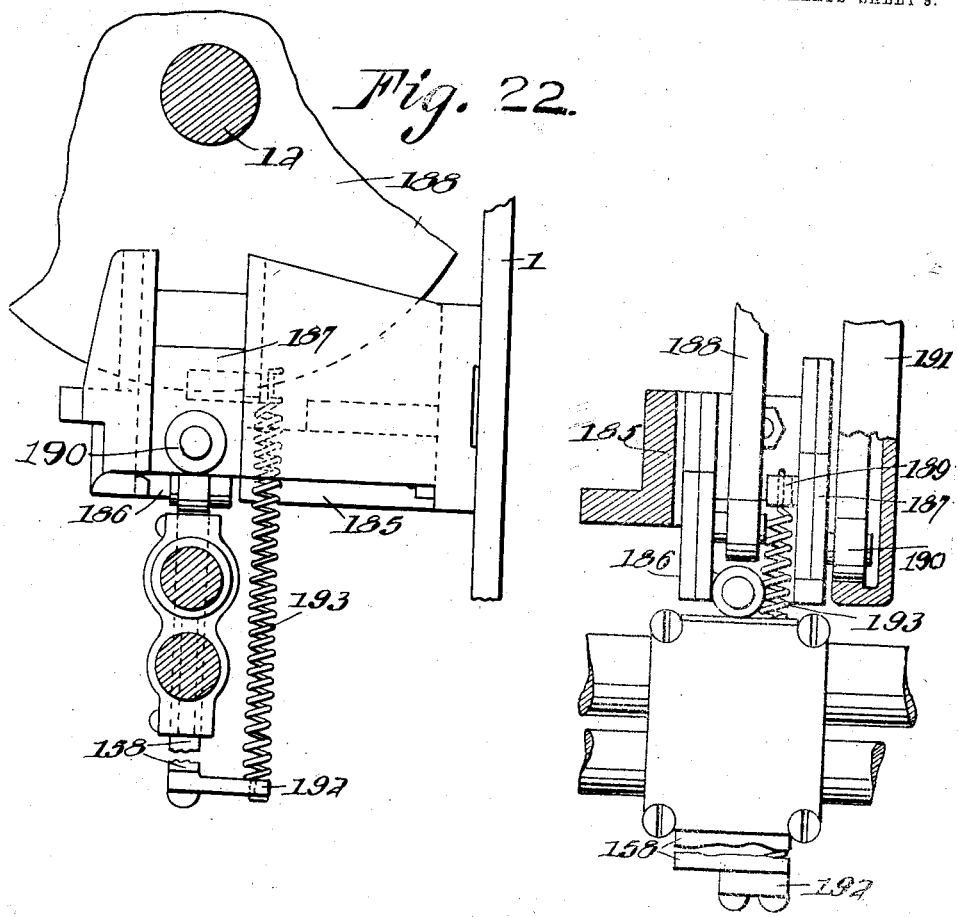
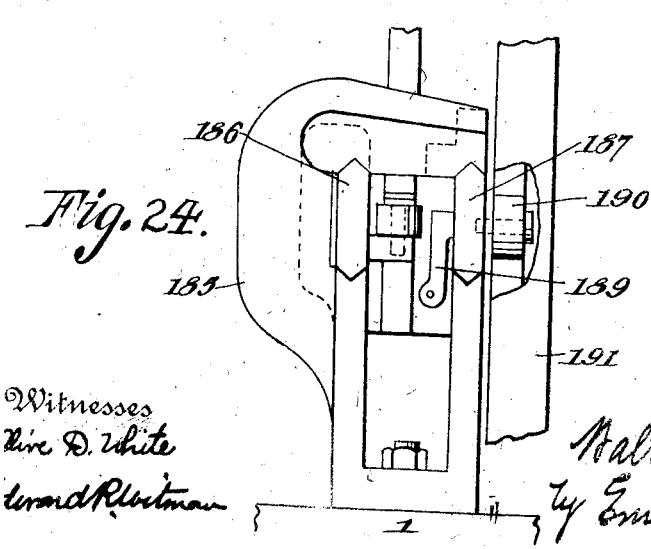

UNITED STATES PATENT OFFICE.

WALTER ALBERT JOSEPH ROACH, OF SAN ANTONIO, TEXAS.

MACHINE FOR SHELLING NUTS.

990,294.

Specification of Letters Patent. Patented Apr. 25, 1911.

Application filed September 20, 1909. Serial No. 518,615.

*To all whom it may concern:*

Be it known that I, WALTER ALBERT JOSEPH ROACH, a citizen of the United States, residing at San Antonio, in the county of Bexar and State of Texas, have invented certain new and useful Improvements in Machines for Shelling Nuts, of which the following is a specification.

This invention relates to nut shelling machines, and pertains more particularly to a mechanism for hulling pecan nuts, and retaining the kernels in their whole condition consisting, in the attainment of the above, in the novel construction and assemblage of parts and devices hereinafter set forth and described.

The main object of the invention is to produce a machine adapted to shell pecan nuts in a simple, rapid and efficient manner, while preserving the integrity of the kernels or meat of the nut. It is well known, that shelled pecan nuts as a commercial product are graded, and each grade is given a particular value. The value of the grade depends upon the condition of the meat, that is, broken meats are of considerable less value than those in perfect condition.

It is, therefore, a purpose of the present invention to provide a machine which, while working rapidly to shell pecan nuts in large quantities, will also preserve the integrity and perfection of the kernels.

It is also an object to provide a mechanism which will feed the nuts from a bulk or quantity contained in a hopper in regulated and positioned order. That is, it is my desire to produce a mechanism which will feed the nuts one by one at regular, predetermined intervals, in a position always the same, whereby the cutting and shelling mechanism may act on the ends in the best and most efficient manner. Also, it is my purpose to provide a mechanism of the most efficient character which will cut the shells from the ends at the points most advantageous for the removal of the kernel, and will cut each nut in the same relative places, and to provide means to remove the shells after said cutting action has been accomplished.

In the attainment of the last named object, that is, the removal of the shells, it is also an object to provide a shell removing mechanism which will not only remove the outer shell from the kernel, but will also simultaneously remove the thin partition piece from between the two "halves" of the kernels or meats. It will be known by those familiar with the art, with the improvements heretofore constructed the object has been almost entirely to provide mechanisms which will secure the removal of the kernels in "halves" only. This old construction, while suited to a great many purposes it is my intention to improve upon, by securing the kernels in an entirely whole condition, thereby securing the kernels for many purposes heretofore unknown or unused by reason of the impracticability of obtaining the whole kernels, and thus increasing the value of pecan kernels and the output of the highest grade or whole kernels.

In the assemblage and construction of the above mentioned mechanisms, it is my further purpose to provide a series of mechanisms whose action throughout is completely and successively performed in the accomplishment of the objects above set forth, from the feeding of the nuts from the bulk to the final step of delivering the whole kernel entirely shelled.

With these and other objects in view, as will hereinafter appear, my invention will now be fully set forth, described and claimed, with reference to the accompanying drawings, which form a part of the specification, and in which:—

Figure 4:
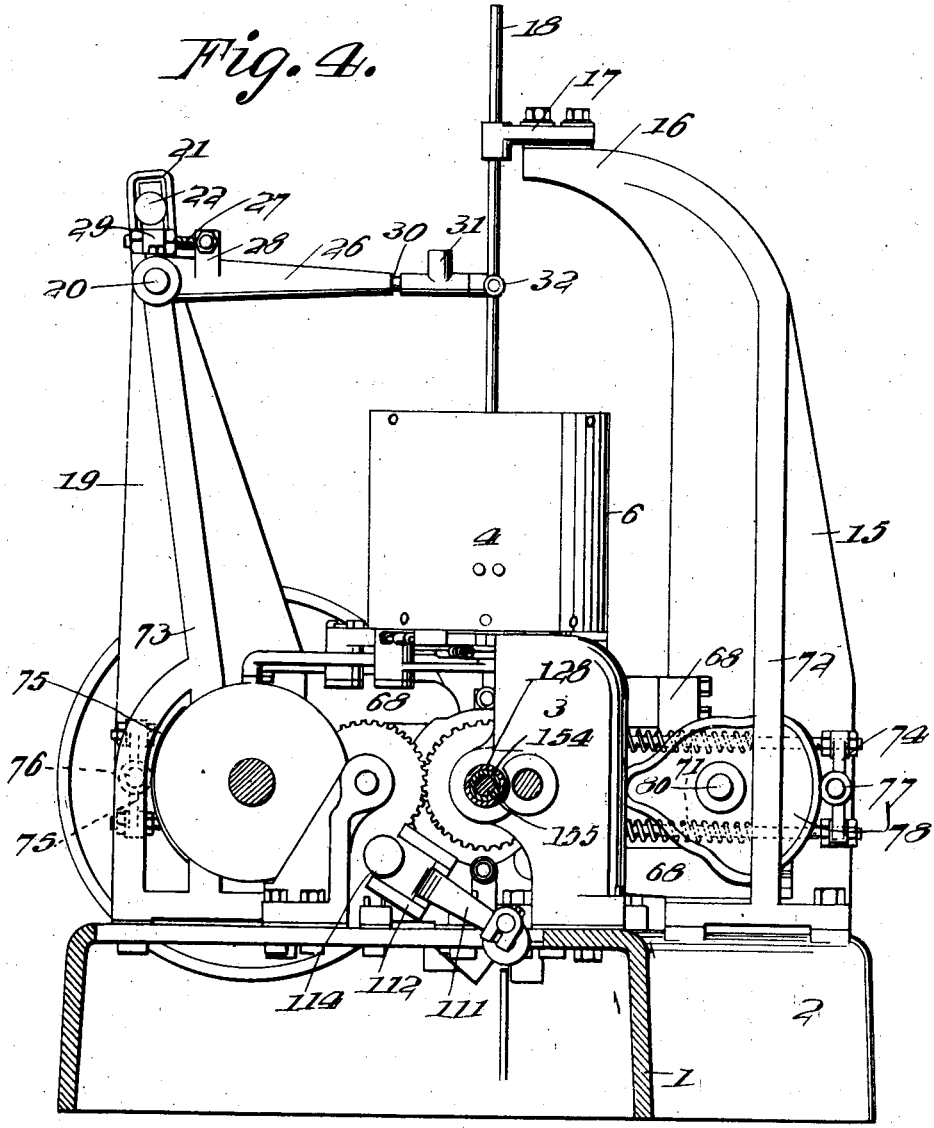
Figure 5:
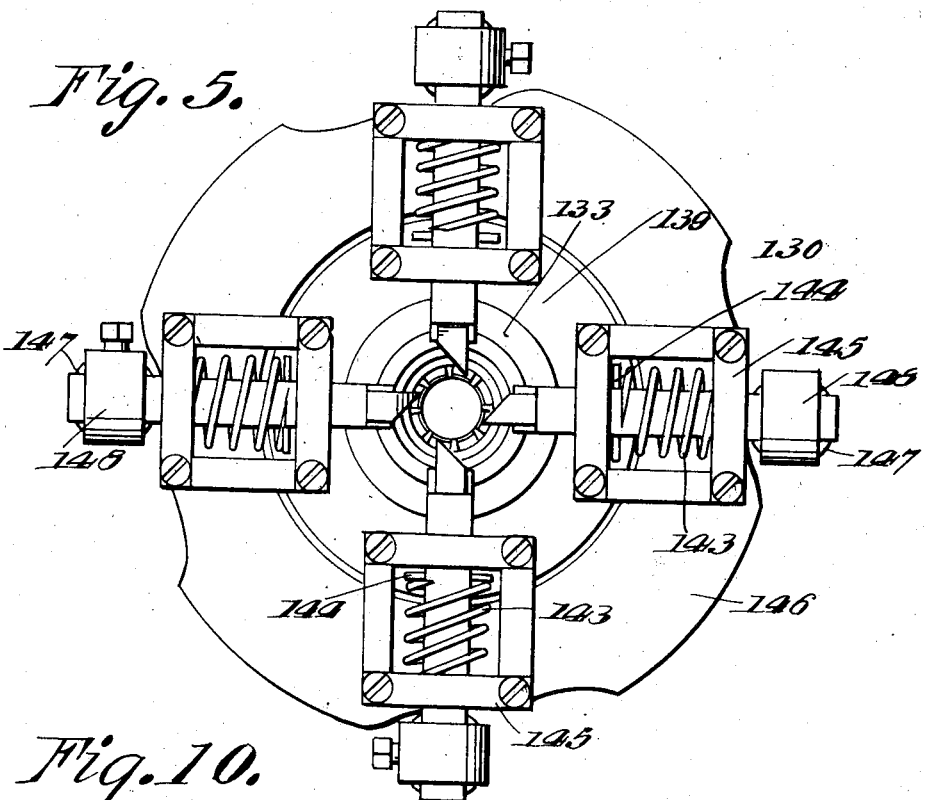
Figure 10:
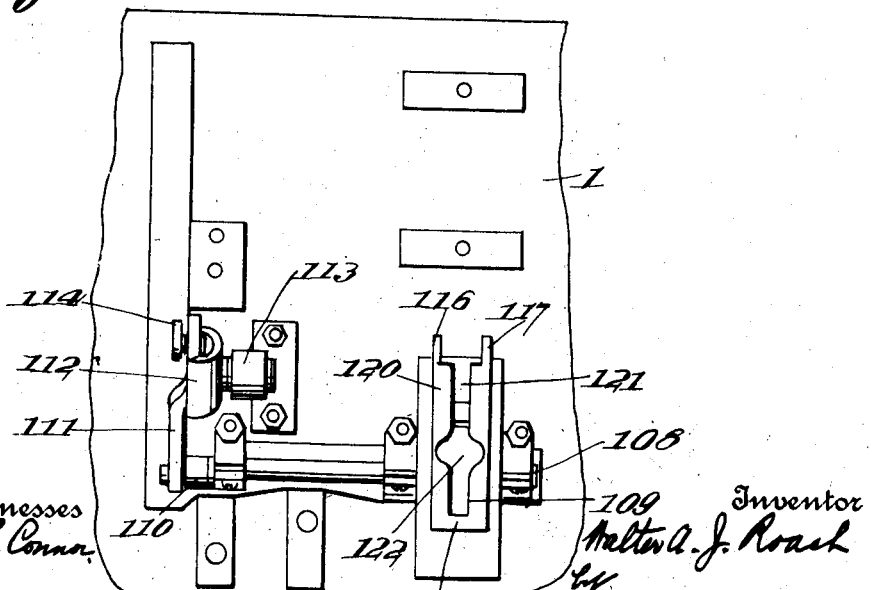

Figure 1 is a plan view of my improved machine showing its various working parts in assembled order. Fig. 2 is a side elevation of the machine, with certain parts of the hopper mechanism broken away. Fig. 3 is a sectional view taken on the line 3—3 of Fig. 1. Fig. 4 is a sectional view taken through the machine on the line 4—4 of Fig. 1. Fig. 5 is a view showing a revoluble head constituting part of the nut cutting mechanism. Fig. 6 is a sectional elevation taken axially through Fig. 5, showing the internal construction of said revoluble head. Fig. 7 is a detailed sectional view taken in the line 7—7 of Fig. 3. Fig. 8 is a detailed view looking horizontally in the direction of the arrows in Fig. 7 below the hopper. Fig. 9 is a detailed view similar to Fig. 8 looking at right angles to the figure shown in Fig. 7. Fig. 10 is a detailed plan view showing a shifting mechanism used in connection with the separator. Fig. 11 is a view of a nut gripping mechanism. Fig. 12 is a side elevation of the separator. Fig. 13 is a longitudinal sectional view of one of the nut crushing members. Figs. 14 and 15 are detailed views of crushing members shown in Fig. 13. Fig. 16 is a fragmentary view of the nut gripping and feeding mechanism. Figs. 17, 18, 19 and 20 are fragmentary detailed views of the cutting and crushing mechanism. Fig. 21 is a detail view in cross section of a portion of the gripping end of a plunger rod. Fig. 22 is an enlarged detail view of the plunger rod actuating mechanism. Fig. 23 is an enlarged detail plan view, partly in section of the plunger rod operating mechanism, and Fig. 24 is an enlarged elevation of the same mechanism disclosed in Figs. 22 and 23.

Referring more particularly to said drawings, in which like numerals of reference indicate like parts throughout, 1 indicates a machine base or supporting structure of generally elongated form, and having an intermediate offset or projection 2. Mounted in suitable position, and secured as by bolts and nuts to the base 1 is a vertical standard 3, which has secured thereto in a position to form an overhang, a hopper 4. Said hopper comprises a bottom plate 5 of suitable material as cast metal, and a cylindrical upright casing 6 secured at its lower edge to said bottom plate 5. Within the top of the hopper 4, fastened by suitable bolts or screws to the inner surface of the cylindrical casing 6, is a spider 7, said spider 7 comprising an annulus having inwardly projecting arms which join a central circular member 8 which forms a mouth or securing member for a feed spout (not shown in print) through which nuts may be fed to said hopper 4. At an intermediate point on the inside of said hopper is secured a second supporting or bracing member 9 which comprises substantially a longitudinally disposed rod having near one end and disposed as hereinafter set forth, an apertured enlargement 10. Mounted longitudinally on the base 1 and having suitable bearings 11 secured to said base, is a main driving shaft 12, having the belt pulleys 13, and fly wheel 14. Said shaft is provided, as hereinafter set forth with the necessary mechanism, and connections to the various part of the machine to drive the latter. The hopper 4, as aforesaid, forms an overhang from said standard, and is so positioned as to project below an upright or standard 15, which is mounted upon the offset 2 and has a horizontally projected arm 16. Said arm 16 carries an adjustable bracket 17, said bracket 17 forming a bearing for a rod or plunger 18. Said rod or plunger 18 extends downwardly into the hopper 4 through a tube 7' supported in the spider 7, and in said enlargement 10 formed in the brace rod or bar 9, the latter forming a lower support for said tube 7', and said plunger is adapted to be vertically reciprocated in suitable bearings in said tube by means of suitable mechanism operated from said main shaft 12. Said rod reciprocating mechanism is carried upon a vertical standard 19 mounted upon the base 1 substantially opposite said upright 15. A crank shaft 20 journaled in the upper end of said standard 19 carries at one end a slotted crank member 21 which is engaged by means of a pivoted slide block 22 to a rock lever 23. Said rock lever 23 consists of a heavy metallic shaft pivoted intermediate its ends to said standard, and carries at its lower end a revoluble wiper or roller 24 which is engaged by a groove formed in the cam disk 25, to impart a rock movement to said rock lever, said cam disk being mounted on the main drive shaft 12. Adjustably mounted on said crank shaft 20, and having a connection with said plunger 18, is an arm 26. Through the intermediacy of arm 26 the reciprocating movement of the rock lever 23 is converted into a vertically reciprocatory movement of said plunger 18, as follows:—The movement of arm 26 is rendered adjustable by means of a threaded rod 27 which is threaded into a block pivoted in the lock 28 formed on said arm 26, and in a slide block 29 secured in said slotted crank member 21. By this means, the angular relation between said arm 26 and said crank member 21 may be varied, and consequently the arcual movement of arm 26, as the latter is reciprocated through its connection with the rock lever 23. The outer end of said arm 26 is provided with a reduced portion 30, which projects into a sleeve 31, in which it is slidable. Said sleeve 31 has its opposite end bifurcated to span said plunger 18 upon opposite sides thereof, and the bifurcations 32 are pivotally secured to said plunger. Thus, as arm 26 is arcually reciprocated, the rod 18 is permitted a direct vertical reciprocation in its bearings, by reason of the sliding connection between members 30 and 31.

Located in the bottom of the hopper 4, and mounted upon a stub shaft 33 is a revoluble disk 34, said disk being provided with a plurality of egg-shaped or nut-shaped apertures near its periphery, said apertures being adapted to successively appear over an opening 35 formed in the bottom of said hopper. Said stub shaft 33 extends through the bottom of said hopper, and has secured to its projected end a ratchet wheel 36. Pivotally mounted upon the lower side of a projection 37 of the bottom plate of the hopper 4 is a rock lever 38. Said rock lever 38 is provided at its outer end with a wiper or roller 39 which is engaged and operated by the cam surfaces of a cam 40 mounted upon the main drive shaft 12. The opposite arm of said rock lever 38 extends below the hopper bottom, and is provided with a hook-shaped pawl 41, which is pivotally secured thereto. Said pawl 41 is adapted to engage the teeth of said ratchet 36 which moves said revoluble disk 34, and a spring 42 extended between a lug 43 formed on the rock-lever 38 and a lug 45 formed on the pawl 41 acts to maintain said pawl 41 in normal engagement with one of the teeth of said ratchet 36. Thus, by reason of the reciprocatory movement imparted to said rock lever 38 by the cam 40, the revoluble disk 34 is given a step by step movement, and each movement is sufficient to move one of the egg-shaped apertures in said disk 34 over the aperture 35. Also mounted below the bottom of said hopper upon a stud is a pivoted pawl 46, whose rotary movement is limited by means of a bolt or screw, screw threaded into the arm 47 and locked by nut 50, coming in contact with the projection 49 formed on said hopper bottom. The arcual movement of the pawl 46 is regulated by adjusting the bolt or screw 48 in the arm 47. The opposite end of said pawl 46 is adapted to engage the teeth of the ratchet 36 to stop the revoluble disk 34 with one of the nut-shaped apertures directly above the opening 35 in the hopper bottom. Said pawl 46 is connected to the operating mechanism by means of a rod 51, which is pivotally connected at one end to a boss formed on the end of the rock lever 38, and is slidably extended through a block 52 on said pawl 46. A spring 53 mounted upon the extended end of said rod 51 and bearing between said block 52 and the jam nuts 54 carried by the end of said rod 51, on the forward stroke, imparts the forward movement of the cam 38 to the pawl 46, bringing it into the position which prevents the further movement of the revoluble disk 34, and on the return movement of the cam 38 the spring 53 is freed of tension and the collar 55 coming in contact with said block 52 pivoted in the pawl 46, returns the pawl 46 to a position which permits of the next forward movement of the ratchet 36. That part of the pawl 46 which comes in contact with the ratchet 36 travels faster and farther than the pawl 41 by reason of the position of the pivotal block 52, thus permitting of the initial movement of the ratchet 36. The pawl 41 reaches the end of its forward movement a little previous to the locking position of the pawl 46 with the ratchet 36, the momentum of the revoluble disk bringing the ratchet 36 and pawl 46 to the locked position.

Pivoted on the hopper bottom at correspondingly opposite points, by means of studs 56 and 57 are the bell crank levers 58 and 59. Bell crank lever 58 has one of its arms extended substantially diametrically across the bottom of the hopper and has a reduced portion provided with a stud 60, said stud 60 engaging and being slidable in a bifurcated slotted member 61 formed on the oppositely projecting arm of bell crank lever 59, whereby as the levers are rocked, a movement of one will impart a corresponding and equal movement to the other. Suitable means are provided, such as coil spring 59ᵃ interposed between the arm of bell crank lever 59 and a point on the casing or hopper bottom, to maintain the bell crank levers in the normally straight position shown in Fig. 7. One side of the plate forming the hopper bottom is extended into a substantially rectangular projection 62, whose lower side is provided with a dove-tail groove 63, in which are mounted for opposing sliding movement a pair of guides 64 and 65, (Figs. 9 and 10) which form a spout or feed chute. Said guides each comprise a substantially triangular shaped plate having their opposing straight sides provided with concaved or rounded grooves. Said grooves may be formed in the elements 66 and 67 formed on or secured to said plates, or said grooves may be formed directly in the edges of said plates. The opposite free ends of said bell crank levers 58 and 59 are each pivotally connected to one of said guides 64 and 65. The lever 59 is connected to guide member 64 by means of the slot and pin connection formed by a bifurcated member 59ᵇ formed on the end of the bell crank lever 59, and a stud or projection provided on the member 64. The bell crank lever 58 is connected to the guide member 65 by means of a stud formed on or provided for the arm of lever 58, said projection engaging a slide block 68 which is slidable in a transverse groove 69 formed in the upper edge of the guide member 65. The grooves formed on the opposing face of said guide members 64 and 65 are so shaped that they form with one another an oval-shaped spout or chute, said spout or chute occurring directly below the aperture 35 formed in the hopper bottom, and consequently directly below the egg-shaped apertures formed in the revoluble disk 34 as each of said apertures is brought into coincidence with the aperture 35.

As aforesaid, the rod or plunger 18 is mounted for vertical reciprocation, and the lower end of said plunger is adapted to be projected through the aperture 35, and downwardly between the guide members 64 and 65, thereby acting as a drive rod or feed rod for the spout or chute. Thus, it is evident, that, as the nuts contained in the hopper 4 are agitated by the step by step revolution of the revoluble disk 34, certain of the lowermost nuts will become seated in the apertures in said disk, and as the nuts are carried around by said disk, it will eventually be brought over and pushed through the aperture 35 in the hopper bottom. The opposing grooves forming the spout or chute occurring exactly below said aperture 35, the nut will be received thereby, and the reciprocation of the plunger 18 being accurately timed, the nut so projected through said aperture 35 will be forced by said plunger between the guide members 64 and 65 and gripped between said grooves. By reason of the fact that the guide members 64 and 65 are connected by the bell crank levers 58 and 59, and said bell crank levers are spring actuated to maintain said guide members normally with their grooved faces in their closest position, it is evident that the members will be equally moved, by the spreading action of the nut, and the accurate centering of the opening between the guide members 64 and 65 below the opening 35 of the hopper bottom will not be disturbed. It will also be seen that by reason of the expansibility of said spout or chute the nuts of minimum and maximum size will be equally well accommodated. The distance between the concave faces of the guide members 64 and 65 in their innermost position is regulated by a screw 65', threaded into the guide member 65, coming in contact with a lug or projection 62' formed on the hopper bottom. Said spout or chute feeds the nuts to a pair of gripping members, located directly below the lower end of said chute, and in line with said plunger 18, said gripping members being adapted to receive the nuts in a horizontal position, or substantially as they are delivered from the chute, and to hold them gripped in said horizontal position, during certain periods of the cutting, crushing and shell removing operations and to grip the kernel after the intermediate portion of the shell has been cut away.

Referring to Figs. 3 and 4, 68 are four brackets projecting inwardly from the opposing sides of the vertical standards 15 and 19, said brackets 68 being arranged in pairs, one on each standard, and having the inner opposing faces of each pair of brackets provided with grooves, preferably V-shaped to form slide-ways or guides for horizontally reciprocable gripping members 69 and 70. Each gripping member 69 and 70 comprises a head having rearwardly projecting rods 71, preferably two in number which extend to and through webs 72 and 73 projected longitudinally through the sides of said standards 15 and 19, said webs or wings 72 and 73 forming bearings for said rods, and the extended ends of said rods are spanned or joined by cross heads 74 and 75. Said cross heads 74 and 75 are each provided with wipers or cam rollers 76 and 77, which are engaged and operated by the cams 78 and a corresponding cam located on the opposite side of the machine, and not visible in Figs. 3 and 4, said cams being conformed to give an intermittent reciprocatory movement to the heads 69 and 70, through the intermediacy of said rods 71, and the cross heads 74 and 75. Springs 71' are mounted on said rods 71, and are interposed between said heads and said webs 72 and 73, in order to maintain the heads 69 and 70 in a normally contacting or inner position, thereby acting in opposition to the cams 78 and 79. Cam 79 is carried by the main drive shaft 12, and cam 78 is carried by a second shaft 80, and said cams are so disposed upon said shafts 12 and 80, that their cam surfaces are disposed in opposite relation, so that the reciprocation of heads 69 and 70 will be always in opposite directions, that is, simultaneously toward or away from one another. The shaft 80 is mounted longitudinally in bearings 84 and 85 secured to or mounted on the base 1 and the upright 15 of the machine, and parallel to the main drive shaft 12, and is operated through the intermediacy of a transverse shaft 81 and the beveled gear connections 82 and 83. Each of said heads 69 and 70 is formed of similar parts, though oppositely disposed, and a description of one will suffice for both.

Referring to Fig. 11, 86 and 87 are a pair of oppositely disposed, and similarly formed blocks, each of which has a comparatively deep recess 89 and 90, and forwardly inwardly extending portions or projections 91 and 92. The outer edges 93 and 94 are beveled or V-shaped to conform to the opposing faces of the brackets 68 and said blocks 86 and 87, form a housing with the side plates 95, one of which is bolted, screwed or otherwise fastened to each side of each pair of blocks 86 and 87. Located within said housing, and having their body portions conforming to and slidable in the recesses 89 and 90, are oppositely disposed blocks 96 and 97, said blocks having the heads or projections 98 formed from and disposed flush with the outer edges of the portions or projections 91 and 92. The adjacent ends of the heads 98 are cut away so that together they form a substantially semi-circular recess 99. The inner portions of the blocks 96 and 97 are cut away and oppositely beveled along the edges 100 and 101, and upon said edges are seated the blocks 102 and 103. The blocks 96 and 97 are normally held in contact with the blocks 103 and 102 by springs 96' and 97' secured in the recesses of blocks 96 and 97 on one end and in the blocks 103 and 102 on the other end. These springs are only emergency or safety springs and act only when some irregularity occurs. Interposed between said blocks 102 and 103 is a cross-shaped member 104, whose laterally extended arms are provided with grooves which embrace and are slidable on tongues formed on said blocks 102 and 103, and whose head extends between projections 98. The foot of said cross shaped member 104 operates slidably between the blocks 86 and 87. A spring 105 mounted upon a pin 106 which is slidable through a U-shaped member 107, joining said blocks 86 and 87, tends to maintain the member 104 in position between the projections 98. From the above it will be seen that the action of the cross shaped member 104, in opposition to the spring 105, by reason of the beveled tongue and groove connection of 104 with the blocks 102 and 103 and through the normally permanent connection of the slidable members 96 and 97 with the blocks 103 and 102, moves the slidable members 96 and 97 and consequently the projections 98 toward each other.

When the spring 105 moves the cross shaped member 104 the members 96 and 97 move away from each other and the projections 98 and 99 assume the relative position shown in Fig. 16. This action removes the kernel from the grips after the shelling has been completed as will be explained later. Fig. 11 shows the relative position of the parts 98 and 99 when nut or kernel is grasped, the heads having moved inwardly by the springs 80. The upper corner of each head is upwardly and rearwardly beveled or inclined, whereby a mouth is formed to receive the nuts from the spout or chute as the plunger 18 drives them downwardly to said heads. The gripping mechanism here described is operated and timed so that the heads or jaws will be in position to be opened or spread as each nut is successively brought down to the chute by the plunger 18.

In operation, when the nut forced downward through the chute by the feed rod 19 enters the circular cavity between the heads formed by the movable members 98, and 104, the first pressure as the heads move toward one another is exerted on the nut by the opposing members 104, and as the heads continue to move toward one another, members 104 are pushed inwardly against the tension of springs 105, and also in opposition to the springs carried by the rods 71, which normally maintain said heads in their closest relation to one another. Thus, as the members 104 are retracted, the members 96 and 97, are moved toward one another, and are brought to seat upon the surface of the nut, thus relieving the members 104 of the entire support of the nut, and disturbing the pressure exerted by the heads around the entire periphery of the nut, thus centering the nut. Also, by distributing the pressure around the periphery, the kernel is gripped by a greater pressure than would be possible, without injuring the kernel by crushing, than if only two members, such as members 104 were used to hold the kernel after the shelling action. When the heads are retracted or spread apart after the shelling action is completed, the members 96 and 97 being the first, in the inverse operation of the heads, to leave the kernel the members 96 and 97 assume the relative position shown in Fig. 16 as aforesaid.

A separator is mounted for intermittent movement into position to separate the shells from the kernel. Mounted for rotation comparatively close to or recessed in the base 1 of the machine, is a shaft 108, and journaled in bearings mounted upon said base. One end of said shaft extends below said gripping heads 69 and 70, and carries the separator member 109, and carries upon its opposite end the shifting or operating mechanism. Said shifting or operating mechanism, consists in a comparatively short crank arm 110, secured to said shaft 108, and having pivotally secured to its free end a pitman 111, whose opposite end is slidably mounted in a slide bearing 112. Said slide bearing 112 consists of a casing having oppositely disposed slide grooves formed therein, and having a stud or journal projected from its rear side and mounted in a bearing 113 secured to the base 1. A wiper or roller 114 secured to the outer side of the pitman 111 and suitably disposed toward the outer end thereof, is engaged by a cam groove formed in a cam disk 115 mounted on the main shaft 12. Thus as said cam disk is revolved, the pitman 111 is rocked, and in turn shaft 108 is given an oscillating movement, the guide bearing 112 acting to throw the pitman in the proper reciprocating path. Said separator member or separating mechanism 109, mounted upon the end of the shaft over an opening in the base 1 to occur adjacent the gripping heads 69 and 70, consists generally, of a housing substantially triangular in shape, and having a bearing member formed at or near the lower apex thereof. Said bearing member is securely attached to the shaft 108, so that the housing will be carried above the base 1. Said housing consists or may consist of an integral casting, having opposite walls 116 and 117, a central partition 118 and the ends walls 119. The upper side 120 of said housing is provided with a longitudinal slot 121 which extends substantially the entire length of said top, and is enlarged into a cavity 122. One end of said slot 121 terminates in the side of the housing at 123. The lower end 124 of said housing, on each side of the bearing 109ª, is provided with openings. Said side walls 116 and 117 near the upper side 120 are provided with similar walls 125, which terminate at one end of said side in comparatively large circular openings 126. In practice, the double, or practical bifurcated formation of the housing permits it to be mounted upon the shaft 108 to be rocked toward or from the gripping heads 69 and 70, and to straddle the same. That is, the housing is so disposed that each one of its walls 116 and 117 lies on either side of the gripping heads 69 and 70, and the slot 121 formed in the upper side 120 of said housing, permits said housing to move backwardly and forwardly on each side of said gripping heads, as it is rocked or reciprocated by the shaft 108. The housing is so mounted upon said shaft 108, that, as a nut is carried downwardly toward the gripping members by the plunger 18, the aperture 126 will be registered with the lower end of the plunger, or with the nut, to permit its passage into said housing to be engaged by the gripping members. During the downward movement of the nut through the aperture 122 and into the grip members the separator is held in a position with the large circular opening 126 concentric with the crushing members. The mechanism which is employed to operate on the nuts to cut, crush, and shell the latter is permitted to operate through said openings 126. As the housing which forms the casing of the separator 109 is adapted to receive and conduct away the shells as they are taken from the nuts or kernels, it is necessary that a completely inclosed passageway be provided to deliver said shells away from the shelling mechanism. To this end, the baffles 127 carried by stems which are secured to the brackets 91, are adapted to abut the upper end of the central partition 118, when the separator 109 is swung into the position where the openings 126 register with the opening between the gripping heads, thus forming a practical continuation of said central partition 118, and eliminating any possibility of shells which are separated from the kernel from falling behind said partition 118, but, on the other hand, insuring the positive delivery of said shells through the opening at 124 in the lower end of the separator 109.

Mounted longitudinally of the machine, and extending from points adjacent opposite sides of the separator 109 toward opposite ends of the machine, are horizontally slidable or movable tubes 128, said tubes being mounted in bearings 129, and having revolubly mounted on their inner ends, the cutting heads 130. Said cutting heads each comprise the co-acting elements as follows: A sleeve 131 is revolubly mounted on the end of tube 128, between the fixed collar 132 and the removable and adjustable collar 133, and is provided with the intermediate flange 134 and the angled flange 135. A substantially broad gear 136 having its hub and web disposed at one end thereof, is secured as by bolts or screws to the intermediate flange 134. A second similarly constructed gear 137, having a larger periphery, is secured for revoluble movement to said angled flange 135 by means of a collar 138 which holds said gear against the portion 139, to secure said gear in place. Projected longitudinally from said flange 135, at equal distances around the inner opening of said flange, are four projections 140, which are in turn formed or turned at right angles to the longitudinally radial projections 141. Said radial projections 141 are machined to form rectangular housings and constitute housings in which cutting members 142 are journaled for radial sliding movement, said cutting members 142 having squared shanks or stocks which slide in bearings formed in the longitudinal portion of the projections 140 and in the upper portions of said radial projections 141. Cross pieces 145 secured, as by screws, to the housings 141, serve to secure the shanks in place. Said cutting members are normally held in their innermost position, with their edges nearest the center or axis of the revolving head 130. This is accomplished by means of coil springs 143 which inclose the shanks of said cutting members 142 and bear between the upper portions of the radial projections 141, and pins 144 projected through said shanks. As said head 130 is revolved, the cutting members are given a timed intermittent radial movement. In order to accomplish this, a cam disk 146, which is provided with four, equally spaced actions or depressions, is secured, as by screws or bolts to the gear 137, said cam disk being adapted to coöperate as said gear is revolved on said head 130, with the wipers or rollers 147 revolubly mounted on adjustable collars 148 secured to the outer or projecting ends of the shanks or stocks of said cutting members 142. Said cutting or knife members 142, are projected outwardly, parallel to the axis of the head 130, at the lower end of the shanks or stocks, and at the outer extremity of said horizontal or axial portions, are curved inwardly toward the center or axis of said head, and are sharpened and beveled from one side to an angle approximately 45 degrees in order to form the knife or cutting edges of the knife members. When said heads 130 are mounted upon said tubes 128, the latter being journaled in said bearings 129 secured to the base 1, the gears 136 mesh with gears 149, and gears 137 mesh with gears 150, said gears 149 and 150 being mounted upon a shaft 151 mounted upon the base 1 in suitable journals, and having gear connections through spur 152 and gear 153 with the main shaft 12.

In practice, the gear 152 is constructed four times as large as the gear 153 on the shaft 151, so that said shaft 151 will revolve four times to the single revolution of the main shaft 12. Also, the gears 136, fixedly secured to the revolving heads 130 are constructed of the same size as the gears 149 which drive the former from the shaft 151, and the loose gears 137 carried by the heads 130

130 are provided in such relation to the corresponding driving gears 150 carried by the shaft 151, that as the gear 136 and consequently the heads 130 are revolved through sixteen revolutions, the gear 137 has made fifteen revolutions. By reason of the movement of the gears as above described, the knives, through the cam disks 146 are given an intermittent inward movement, and while in their innermost position are given time to revolve once to exert their cutting action around the entire periphery of a nut. The tubes which carry said heads 130 as hereinafter more fully described, are mounted to retract and present said heads at timed intermittent intervals suitable for permitting the knife members to perform the cutting action.

Slidably fitted within the tube members 128 are the secondary tubes 154, and slidably fitted within the said tubes 154 are rods 155. Said rods carry on their projected ends the bifurcated or forked members 156 between the ends of which are journaled rollers 157. The tubes 154 are slotted, to permit of the transverse movement of a member 158, hereinafter more fully described, through the said tube 154, said slot being of sufficient length to permit of the movement of the tubes 154 over said member 158, and on the inner end of the rods 155 is formed a tongue the ends of which operate on the bottom of the slot 184 and is bifurcated to straddle the same member 158. Threaded into the opposite or inner ends of the tubes 128 are bushings or bearings 159, said bearings being axially bored to receive therein for slidable axial movement, a plunger rod 160. The outer end of said bushing 159 is extended in the form of a reduced collar, having the same axial bore as the main portion of the bushing, and terminating at its outer end in a series of teeth, said teeth being formed as shown in Figs. 15 and 21, with one substantially axially extended face, and one irregular or curved face. Said extended bushing, with the teeth formed thereon form what are termed crushers. Said plunger rod 160 extends through said bushing and its extended portion, and has secured thereto by means of a slot and pin connection through the extended portion of said bushing, an outer sleeve, which moves longitudinally or axially with said plunger, and slides on the outside of said extended portion. The latter end of said plunger rod has secured thereto by means of a bored portion or screw threads, a rod 161 whose rear end is provided with a piston 162, the function of which will be later explained, which is adapted to reciprocate in a casing or cylinder 163 formed by a collar and plug secured in the tube 154. Mounted on said rod 161, and bearing between the collar in the end of the tube 154 and a fixed sleeve 165 on said rod 161, is a coil spring 164 which normally tends to press the plunger rod 160 outwardly from said tube 154. A cam 166 mounted upon the shaft 81, and a corresponding cam 167 mounted upon a shaft 168 journaled in suitable bearings at the opposite end of the base 1 and driven by beveled gears 169 and 170, from the main shaft 12 act against the rollers 157 secured to said rods 155 to simultaneously move the crushing members, above described, toward each other. Secured to the rear ends of the tubes 154, and having a rigid connection with the reciprocating shafts 171, are the cross pieces 172. Said reciprocating shafts 171 are journaled in bearings 173 formed in the sides of the shaft journals of the shafts 168 and 81, and have laterally projecting stubs upon which are mounted the rollers or wipers 174 which operate in cam grooves formed in the cam disks 175 mounted upon the shafts 81 and 168.

The reciprocating shafts 171, cross pieces 172, tubes 154, piston 162, rod 161, plunger rod 160 and tubes 196 constitute a centering and plunger member. The movement of the reciprocating shaft 171 being always the same and in consequence the movement of the tubes 154, the spring 164 accommodates the nuts of various sizes between the centering tubes 196.

In order to provide for the operation of the crushing and shelling mechanism on nuts of varying sizes, it is necessary to provide an automatically adjustable operating mechanism. Mounted parallel to the tubes 128, and journaled for longitudinal sliding movement in the bearings 129 are slideshafts 176, which have rigid off-set connections 177 with the ends of longitudinal shaft members 178 whose opposite ends are slidably mounted in slide-bearings 179 provided therefor on the journals of shafts 168 and 81. Laterally projecting stubs 180 formed on shaft members 178 are provided with wipers or cam rollers which project in and are operated by the internal one face cams 181, whose faces are so formed and positioned as to bear the same relation to the cams 166 and 167 as the outer face of a groove cam, mounted on shafts 168 and 81, whereby the longitudinal forward movement given to the crushers by the cams 166 and 167 is returned on the return movement through the intermediacy of the member 158. The slide shafts 176, connections 177 and longitudinal shaft members 178 constitute the return members.

The tubes 128 and the slide shafts 176 are slotted at points intermediate their ends, and at adjacent points, said slots extending horizontally and registering with one another. Projected through said slots, transversely of said tubes 128 and shafts 176 is a flat, generally rectangular cam block 158, above referred to in connection with the sliding rod 155. Housing plates 183 having parallel longitudinal grooves, and a transverse slide-way for the reception of said blocks 158 are rigidly secured to said tubes 128, to house said registering slots, the blocks 158, and to permit the slide-shafts 176 to be reciprocated therethrough, said housing and cam blocks 158 being adapted to form an adjustable connection between said housing 183 and the crushing rods 155 on the forward movement and between shaft 176 and housing 183 on return movement, as will hereinafter appear. On each side of said cam block 158 from the opposite ends are formed grooves the bottoms of which are inclined from the sides, forming cam faces, the one 184 being engaged by the tongues of the rods 155 and the other by the tongued projections 194 formed in the slots of the slide shafts 176, the cam block being guided in its transverse movement through the slots formed in the tubes 128 and slide shafts 176 by the sides of the housings 183. The tubes 128 are given a longitudinal sliding movement forward through their connection with the crushing rods 155 by a transverse movement of the blocks 158 in the direction of the main shaft 12 through the slots and the housing provided therefor, presenting different portions of the inclined cam face 184 to the crushing rods 155 to give movement of varying length to the tubes 128, and in like manner on the return movement of the blocks 158 the bottom of the slots 195 engaging the projecting lugs 194 in the shafts 176 returns the forward movement imparted to the tubes 128 by the forward movement of the blocks 158.

By reason of the cam faces 184 and 195 being parallel with each other the longitudinal movement of the cam block occasioned by its movement in the direction of the main shaft is permitted without any movement of the slide-shaft 176 and similarly on the return the longitudinal movement of the block is permitted without any movement of 155, the traverse movement of the cam block in either direction not affecting the distance between 176 and 155 each being moved simultaneously and equally.

Mounted in transverse slide-ways formed in standards 185 secured to the base 1 are vertically disposed plates 186 and 187. The plates 186, are provided with cam rollers or wipers taken from their outer sides, one of said wipers on each plate being horizontally disposed and the other being vertically disposed. The horizontally disposed wiper is adapted to be engaged by the end of the cam blocks 158, at predetermined intervals as will hereinafter appear, and the vertically disposed wipers are adapted to be engaged by the cam disks 188, to move said blocks 158. The plates 187 are provided upon one side with projections 189 and with cam rollers or wipers 190 upon the opposite sides, said rollers or wipers 190 being engaged by internal one face cams 191, mounted upon the drive shaft 12. Downwardly projecting from the cam blocks 158, at their rear ends are brackets 192 between which and the projections 189 formed in plates 187, are mounted the springs 193.

The outer end of the plunger rod 160 has secured thereto a member which has been termed a centering device. Said centering device comprises a tubular sleeve 196 secured to said plunger rod 160 by means of a pin 197 projected through said sleeve 196 and said plunger rod, and inclosing the extended portion of the bushing 159. Slots 198 formed in said extended portion of bushing 159 permit the longitudinal movement of the plunger rod 160, and the sleeve 196 independently of the extended portion of the bushing 159, which latter comprises the crusher, as aforesaid.

The operation of the machine generally is as follows:—The hopper 4 being supplied with a quantity of nuts, or being placed in communication with a nut supply, and the main shaft of the machine being driven from any suitable power, the revoluble disk 34, tends to agitate the nuts, and to receive in the apertures formed therein, nuts which are thus disposed with their length extended radial of the disk 34. Thus, as each nut, through the step by step progress of the disk 34 is brought over the aperture 35 in the hopper bottom it is already placed in position to be received by the chute formed by the members 64 and 65, and is also in position to be downwardly projected through said chute by the reciprocating plunger rod 18. The nut having been downwardly projected through said chute, is received by the gripping heads 69 and 70, whose movements are timed, by suitable action of the cams 78. The gripping members 78 having been brought to bear upon the nut, with the members 98 and 99 bearing with equal pressure around the middle periphery thereof, the separator member 109 being in the position shown in Figs. 12 and 3 with the apertures 126 in registration with or located concentrically with the center of the nut, the centering tubes 196 are first brought in contact with the nut by the action of the groove cams 175, making a final adjustment of the ends of the nut concentric with the crushers. The tubes 128 are then caused through operation of the cams 166 and 167 acting through the rods 155 on the blocks 158, to move the crushers forward or toward each other bringing said crushers in contact with the nut of maximum size, after which the grip separate, the cutting heads 130 continually rotating through the action of the gears 136 130 and 149. A further action of the cams 166 and 167 exerts a limited crushing action on the nut, thereby breaking the shell intermediate the ends of the nut. Said crushers also act through the teeth carried by the ends of said crushers with a cutting action, thereby separating the intermediate portion of the shell from the end portions of the shell, said end portions resting and being held by the teeth within the open ends of said crushing members. This step having been accomplished, the heads 130 bearing the revolving knives 142 are next passed, until the points of the knife come in contact with the shell where the latter has been broken or cracked away from the end portions, and through the revolution of said knives the said cracked or broken portions of the shells are cut and turned away and are dropped into the separator housing in front of the central partition 118. After the knives have performed this function, the gripping heads are brought inwardly by the action of the springs 71' and grip that portion of the kernel from which the shell has been removed similar to the manner in which it previously gripped the nut, and as before stated, the peculiar action of the grip members distributing the pressure around the periphery of the kernel permits of its being gripped with a firmness that would otherwise injure it. The cutting and crushing members are then caused to recede, the end portions of the shells remaining or being held by the teeth within the crusher heads, and receding therewith, and the kernels remaining held in the grips and entirely free from shell. While the separator 109, which up to this point has not moved, is being rocked so that the partition 118 is brought into the position indicated by the dotted lines Fig. 12, the grips open but the separator is in the position above mentioned before the kernel has had time to drop. This will be understood since the actions occur very rapidly. The kernel falling behind said partition 118 falls out through the opening on the opposite side of the bearing 109ᵃ from which the shells fall, into a separate receptacle provided therefor. In the event of a kernel having been carried away by sticking to one of the end portions of the shell, when said end portion is carried away by the receding crushing member, and the separator continuing its movement in the direction above mentioned, said kernel will nevertheless be engaged by the portion of the slot 125 and be drawn thereby free from said end portion of the shell, and dropped behind the partition 118, in the usual manner.

It is evident, of course, that nuts of varying sizes must be operated on by the machine, and the automatic adjusting means must operate positively and rapidly to successively shell nuts of maximum and minimum size. Thus, the cam block 158 in being drawn toward the slide plate 187 by means of the spring 193, acts as a connection between the tube 128 and the crushing rod 155 by means of which the relative distances which said tubes and their contained elements travel, may be varied. That is, when a nut of maximum size is held in the centering tubes 196 and the crushing members projected, movement of the cam block 158 is sufficient to stretch the spring 193 and maintain the cam block 158 and tubes 128 in a fixed relation. However, if a nut of minimum size is held in the centering tubes and the crushing members, advanced by the tubes 128 not reaching said nut of minimum size the tension exerted on the spring 193 by the action of the cam 191 in drawing the slide plate outwardly toward the main shaft 12 moves the cam block 158 laterally in the same direction.

The crushing rods 155 being in contact with the cams 166 and 167 the action of the cam face 184 against the end of said rod 155 moves the housing 183 and tubes 128 until the crushers come in contact with the nut of minimum size, after which further actions of the cams 166 and 167 complete the cracking. During the interval that the cams 191 draw the cam blocks 158 in the direction of the main shaft or stretches the spring 193 there occurs an action on the cams 166 and 167. If the nut was of maximum size, the crushers being on the nut at the beginning of said interval said nut of maximum size receives an amount of crack, represented by the action of the cams 166 and 167 during this interval, more than the nut of minimum size receives. The nut of any size greater than minimum receives, in addition to the amount of crack the nut of minimum size receives, an amount represented by the action of the cams 166 and 167 during said interval from the time the cam blocks 158 bring the crushers in contact with the nut until the end of said interval. Hence each nut is cracked a greater or less amount according to its size. In practice the amount of crack varies at a different ratio in proportion to its size.

When the cams 191 (which are internal one face cams) acting on the rollers 190 draw the cam blocks 158 in the direction of the main shaft 12, through the intermediacy of the springs 193, said cam blocks acting on the horizontal rollers of the slide plates 186 and the vertical roller acting on the cams 188 the movement of the cam blocks 158 are timed. The return movement of the above mentioned cam blocks 158 is accomplished by the cams 188 through the plates 186 and horizontal and vertical rollers. The horizontal rollers on the slide plates 186 permit of the free longitudinal movement of the cam blocks 158 with the tubes 128.

Immediately following the interval above mentioned there is a return action on the cams 191 which relieves any tension of the spring 193 and prevents any tendency to a further forward movement of the block 158 in direction of main shaft after this interval. After the last named interval the final action of the cams 166 and 167 complete the cracking. The amount of crack received in this interval is the entire amount of crack the nut of minimum size receives. The knives of the revolving heads being now brought to their inner position turn away the cracked or that portion of the shell between the crushers. The grips as above explained must grip the kernel. If the crushers are too close together to allow for a proper clearance between the revolving knives 142 and the grips when the grips are brought together during this interval the blocks 158 receive an amount of return movement through the cams 188 separating the crushers a small amount for proper clearance. An action of the cams 181 is now communicated to the tubes 128 by the return members, above mentioned, through the cam blocks 158 returning the tubes 128 the amount given by the forward action of the cams 166 and 167, and the cams 188 completing whatever movement there may be necessary to bring the cam blocks 158 to their returned position return the tubes 128 the amount occasioned by the forward movement of the cam blocks 158. The crushers 159 and the knives 142 that had been projected through the opening 126 in the separator being now withdrawn the separator swings into the position above mentioned where partition 118 is in the position indicated by the dotted lines Fig. 12; the grips meanwhile having opened the kernel drops as above explained, the separator continuing its movement releases the kernel from the end of the shell should it not have been held by the grips as above explained. The separator now returns to the position it was in at the beginning, that is with the openings 126 concentric with crushers, after which an action of the groove cams 175 forces the plunger rods 160 somewhat beyond the crushers forcing out the ends of the shell stuck therein and the ends of the shell falling in the separator in front of the partition 118, fall out in the same manner as the middle portion of the shell. The action of the cams 175 is sufficient to bring the plunger 160 somewhat flush of the crushers after the springs 164 have compressed, the piston head 162 coming in contact with the plug in the tube 154, the ends of the shell are struck a solid blow. The reciprocation of the centering and plunger members are such that they perform their function of centering the nut previous to crushing or cracking and presses out the ends of the shell without interfering with 142 or any of the other actions. The grips having returned to the inner portion the ensuing actions of the machine are then continued in proper order.

As a result of the above actions, the entire shell is removed from the pecan nuts without disturbing the integrity of the kernel, and as will be evident, the complete kernels are obtained regardless of the size of the nuts. The automatic adjustability of the engaging and cutting and crushing members being adapted to cause said members to operate on nuts of varying sizes without the loss of time and without injury to the kernels.

It is well understood, of course, that the above described mechanism embodies one of the many forms which my machine may take without departing from the spirit of the invention or from the scope of the appended claims.

Having thus fully described my invention what I claim and desire to secure by Letters Patent of the United States is:—

1. A machine for shelling pecan nuts, comprising, in combination, means for crushing the shells, means for cutting the crushed shells from the kernel, and means for actuating said crushing and cutting means in succession.

2. A machine for obtaining entire nut kernels, comprising, in combination, means for crushing the sides of the shells, means for cutting away said crushed sides of the shells, means for removing the ends of the shells, and means for actuating said crushing, cutting and removing means in succession.

3. A machine for shelling nuts, comprising, in combination, means for cracking the intermediate portions of the shell and cutting the ends of the shell therefrom, and for drawing said ends away from the nut, means for removing said intermediate portions of said shell, and means for successively actuating said cracking, cutting and removing means.

4. A machine for shelling nuts, comprising, in combination, means for cracking the intermediate portions of the shell and cutting and removing the ends of the shell therefrom, means for removing said intermediate portions of said shell, means for feeding nuts to the cracking, cutting and removing means, and means to actuate these mechanisms.

5. A machine for shelling nuts, comprising, in combination, means for holding the nut, opposing means for crushing said nut and removing the ends thereof, means for removing the cracked shell, means to feed nuts to said holding means, and mechanism to successively actuate the foregoing elements.

6. A machine for shelling nuts, comprising, in combination, means for intermediately holding the nut, opposing coöperative means for crushing the shell, and holding the ends of said nut, means for removing the cracked shell, means carried by said end holding means for removing the ends of said shell, means to feed nuts to said means for holding the nut intermediately, and mechanism to successively actuate the foregoing elements.

7. A machine for shelling nuts, comprising, in combination, means for holding the nut, opposing means for engaging the ends of said nut, means operatively connected to actuate said opposing means, for crushing said nut, means operative between said crushing means for removing the cracked portion of the shell, said crushing means being constructed for removing the ends of said shell by retraction of said crushing means.

8. A machine for shelling nuts, comprising, in combination, means for holding the nut, opposing means on each side of said holding means for crushing the middle portion of the shell, means revoluble around said crushing means for cutting away and removing the cracked portion of the shell, said crushing means being also adapted for removing the ends of said shell.

9. A machine for shelling nuts, comprising, in combination, gripping means for surrounding the nut and holding the latter with equally distributed pressure, opposing means for cutting and crushing the intermediate portion of the shell, and means revoluble around said opposing means for cutting away and removing the cracked portion of the shell, said cutting and crushing means being adapted for inclosing and removing the ends of said shell.

10. A machine for shelling nuts, comprising, in combination, axially movable means for cracking intermediate portions of the shell, and cutting the ends of the shell therefrom, revoluble means for removing said intermediate portions of said shell, said axially movable means also removing the ends of said shell.

11. A machine for shelling nuts, comprising, in combination, means adapted to be advanced for cracking the intermediate portions of the shells and cutting the intermediate portions of the shells from the ends thereof, when said intermediate portion has been cracked, and means carried by said cracking means for removing the ends of the shells when said cracking means is retracted.

12. A machine for shelling nuts, comprising, in combination, means for holding the nut at its largest periphery, opposing axially movable means for engaging the ends of said nut, and means mounted upon said engaging means for cutting and crushing the shell of said nut, and for removing the ends of said shell.

13. A machine for shelling nuts, comprising, in combination, means for holding the nut at its largest periphery, opposing axially movable means for engaging the ends of said nut, means mounted upon said engaging means for cutting and crushing the shell of said nut, and for removing the ends of said shell, and means revolving around said crushing and removing means for cutting away the intermediate portions of the shell.

14. A machine for shelling nuts, comprising, in combination, means for holding the nut at its largest periphery, means for engaging the ends of the nut, means mounted upon said engaging means for crushing the intermediate portions and for removing the ends of said shell, and means revolving around said crushing and removing means for cutting away the intermediate portions of said shell.

15. A machine for shelling nuts, comprising, in combination, a hopper, a gripping means, means for feeding nuts from said hopper to said gripping means, and means for crushing said shells, and for removing the ends of said shells from the nuts.

16. A machine for shelling nuts, comprising, in combination, a hopper, a gripping means, means for feeding nuts from said hopper to said gripping means, opposing means for engaging the ends of said nut, means for cutting and crushing the shell of said nut and removing the ends of said shell, and means for removing the intermediate portions of said shell.

17. A machine for shelling nuts, comprising, in combination, a hopper, a gripping means, means for feeding nuts from said hopper to said gripping means, opposing means for engaging and centering said nut, means for engaging the ends of said nut crushing the intermediate portion thereof, and for removing the ends of said shell, and means for removing the intermediate portion thereof.

18. A machine for shelling nuts, comprising, in combination, a hopper, a pair of gripping heads, means for feeding nuts from said hopper to said gripping heads, means upon opposite sides of said gripping heads for engaging the ends of said nut, means mounted concentrically of said engaging means for cutting and crushing the shell of said nut, and retractable along the axis of the nut for removing the ends of said shell.

19. A machine for shelling nuts, comprising, in combination, a hopper, a pair of gripping heads, means for feeding nuts from said hopper to said gripping heads, means upon opposite sides of said gripping heads for engaging the ends of said nut, means mounted concentrically of said engaging means for cutting and crushing the shell of said nut, and for removing the ends of said shell, and means revoluble around said crushing and end removing means for removing the intermediate portion of said shell.

20. A machine for shelling nuts, comprising in combination, means for gripping the nut around its largest periphery, means for cutting and crushing the shell of said nut, and for removing the ends of said shell, said gripping means comprising retractable heads, each head having a plurality of members for approaching and encircling the nut or kernel and means to permit said members to adjust themselves to the contour of the nut.

21. A machine for shelling nuts, comprising, in combination, means for gripping the nut around its largest periphery, means for cutting and crushing the shell of said nuts, and for removing the ends of said shell, said gripping means comprising a pair of opposing radially retractable heads, each head having retractable members which are adapted to approach and completely encircle the nut, and means to permit said members to adjust themselves to the contour of the nut.

22. A machine for shelling nuts, comprising, in combination, means for gripping the nut around its largest periphery, means for cutting and crushing the shell of said nut, and means for removing said shell, said gripping means comprising opposing members having a plurality of elements capable of radial movement and adjustment holding the nut or kernel to be operated on and spring means bearing on said elements to permit said adjustment automatically.

23. A machine for shelling nuts, comprising, in combination, means for gripping the nut, means for cutting and crushing the shell of said nuts, means for engaging and holding the ends of said shell, and revoluble means for removing the intermediate portions of the shell, said revoluble means comprising revolving heads mounted concentrically of said crushing means and having a plurality of radially projected knives for cutting away the shell.

24. A machine for shelling nuts, comprising, in combination, means for gripping the nut, means for cutting and crushing the shell of said nuts, means for engaging and holding the ends of said shell, and revoluble means for removing the intermediate portions of the shell, said revoluble means comprising revolving heads mounted concentrically of said crushing means and having a plurality of cam operated knives for advancing upon and cutting away the intermediate portions of the shell.

25. A machine for shelling nuts, comprising, in combination, means for gripping the nut, means for cutting and crushing the shell of said nut, means for engaging and holding the ends of said shell, and revoluble means for removing the intermediate portions of the shell, said revoluble means comprising revolving heads mounted concentrically of said crushing means and having a plurality of spring retracted knives, a cam disk mounted upon said head, wipers carried by said knives and engaging said cam disks and means for revolving said heads and said cam disks independently.

26. A machine for shelling nuts, comprising, in combination, a hopper, means for cutting and crushing the shell of the nut, means for engaging and holding the ends of said shell, and means for removing the intermediate portions of the shell, and means for compensating said engaging means for nuts of varying sizes.

27. A machine for shelling nuts, comprising, in combination, means for gripping the nut, means for cutting and crushing the shell of the nut and for removing the ends, means for removing the intermediate portions, and means for receiving said kernel from said gripping means.

28. A machine for shelling nuts, comprising, in combination, means for gripping the nut, means for cutting and crushing the shell of the nut, and for removing the ends means for removing the intermediate portions separately, and means for separating the kernel from said cutting and crushing means, said separating means comprising a housing which straddles said gripping means, and having a slot in which the kernel is engaged to be taken from said gripping means and delivered from the machine.

29. A machine for shelling nuts, comprising, in combination, a hopper, a pair of gripping heads, means for cutting and crushing the shells of the nuts, means for removing said shells, and means for delivering nuts from said hopper to said gripping heads, said delivery means comprising opposing grooved members slidable below said hopper, a plunger adapted to be reciprocated between said grooved members, means for reciprocating said plunger, and means for maintaining said grooved members in juxtaposed position.

30. A machine for shelling nuts, comprising, in combination, a hopper, a pair of gripping heads, means for cutting and crushing the shells of the nut, means for removing said shells, and means for delivering nuts from said hopper to said gripping heads, said delivery means comprising opposing grooved slide members mounted below said hopper, means for maintaining said slide members in juxtaposed position, a plunger adapted to be reciprocated between said slide members and to push nuts from said hopper to said gripping heads, and means for delivering nuts one by one below said plunger.

31. A machine for shelling nuts, comprising, in combination, a hopper, a pair of gripping heads, means for delivering nuts one by one from said hopper to said gripping heads, means carried by said delivering means for positioning said nuts, means adapted to be advanced to engage the ends of said nuts, means concentrically mounted of said engaging means for operating on the ends of said nut to cut and crush the shell and to remove the ends of the latter, means for cutting the intermediate portion of the shell from the ends thereof, and means for separating said kernel from said gripping means.

32. In a nut cracking machine, a crushing head comprising, a plunger rod, a centering device, a crushing member, and a series of teeth formed in rings on said crushing member to engage the nuts.

33. In a nut cracking machine, a crushing head comprising, a plunger rod, a centering device, a crushing member, and concentric series of teeth formed on said crushing member to engage the nuts, said series being located in circles one behind the other.

34. In a nut cracking machine, a crushing head comprising, a plunger rod, a centering device, a crushing member having a hollow end, a series of teeth formed around the outer edge of said hollow end, and a second series formed within said hollow end to engage the ends of nuts.

35. In a nut cracking machine, a crushing head comprising, a plunger rod, a centering device, a crushing member, and a series of teeth formed on said crushing member to engage the nuts, said teeth each having a face radial to the axis of said crushing member and a face irregular to the radius of said axis.

36. In a nut cracking machine, a crushing head comprising, a plunger rod, a centering device, a crushing member, and a series of teeth formed on said crushing member to engage the nuts, said teeth having alternate radial straight faces and curved faces.

37. In a nut cracking machine, a crushing head comprising, a plunger rod, a centering device, a crushing member having a hollow end, a series of teeth formed around the outer edge of said hollow end, and a second series formed within said hollow end in a smaller annulus concentric to said outer series.

In testimony whereof I affix my signature in presence of two witnesses.

WALTER ALBERT JOSEPH ROACH.

Witnesses:
EMIL BEHRENS,
ELFRIEDA BEHRENS.